(12) United States Patent
Yagnik

(10) Patent No.: US 8,417,751 B1
(45) Date of Patent: Apr. 9, 2013

(54) SIGNAL PROCESSING BY ORDINAL CONVOLUTION

(75) Inventor: Jay Yagnik, Santa Clara, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/289,416

(22) Filed: Nov. 4, 2011

(51) Int. Cl.
*G06F 17/10* (2006.01)
*G06F 17/15* (2006.01)
*G06K 9/64* (2006.01)

(52) U.S. Cl. .................. 708/315; 708/420; 382/279

(58) Field of Classification Search ............ 708/300, 708/315, 420–421
See application file for complete search history.

(56) References Cited

U.S. PATENT DOCUMENTS

| | | | | |
|---|---|---|---|---|
| 4,439,840 | A * | 3/1984 | Coleman et al. | 712/300 |
| 4,441,165 | A * | 4/1984 | Coleman et al. | 708/207 |
| 5,917,733 | A * | 6/1999 | Bangham | 708/300 |
| 6,904,179 | B2 * | 6/2005 | Handley | 382/260 |
| 2005/0285974 | A1 * | 12/2005 | Kim | 348/448 |

OTHER PUBLICATIONS

"Supplementary Examination Guidelines for Determining Compliance With 35 U.S.C. 112 and for Treatment of Related Issues in Patent Applications (Notice)," Federal Register vol. 76, Issue 27 (Feb. 9, 2011), pp. 7162-7175.*
L. L Babai, P. Felzenszwalb; "Computing Rank Convolutions with a Mask," ACM Transactions on Algorithms, vol. 6, No. 1, Dec. 2009.*
Stork, "Median Filters Theory and Applications" ELECO'2003 3th International Conference on Electrical and Electronics Engineering Papers, 2003.*
P. Soille, "On morphological operators based on rank filters," Pattern Recognition, vol. 35, No. 2, pp. 527-535, 2002.*
Sema Koç, Ergun Erçelebi, Image Restoration by Lifting-Based Wavelet Domain E-Median Filter, ETRI Journal, vol. 28, No. 1, 51-58, 2006.*
D. V. Rao, S. Patil, N. A. Babu, and V Muthukumar, "Implementation and Evaluation of Image Processing Algorithms on Reconfigurable Architecture using C-based Hardware Descriptive Languages," International Journal of Theoretical and Applied Computer Sciences, pp. 9-34, 2006.*
D.N. Bhat and S.K. Nayar, "Ordinal Measures for Image Correspondence," IEEE Trans. Pattern Analysis and Machine Intelligence, vol. 20, pp. 415-423, 1998.*
"Interim Guidelines for Determining Subject Matter Eligibility for Process Claims in View of Bilski V. Kappos," Federal Register vol. 75, No. 143 (Jul. 27, 2010), pp. 43927-43928.*

* cited by examiner

*Primary Examiner* — Chuong D Ngo
*Assistant Examiner* — Matthew Sandifer
(74) *Attorney, Agent, or Firm* — Morris & Kamlay LLP

(57) ABSTRACT

Convolutions are frequently used in signal processing. A method for performing an ordinal convolution is disclosed. In an embodiment of the disclosed subject matter, an ordinal mask may be obtained. The ordinal mask may describe a property of a signal. A representation of a signal may be received. A processor may convert the representation of the signal to an ordinal representation of the signal. The ordinal mask may be applied to the ordinal representation of the signal. Based upon the application of the ordinal mask to the ordinal representation of the signal, it may be determined that the property is present in the signal. The ordinal convolution method described herein may be applied to any type of signal processing method that relies on a transform or convolution.

57 Claims, 3 Drawing Sheets

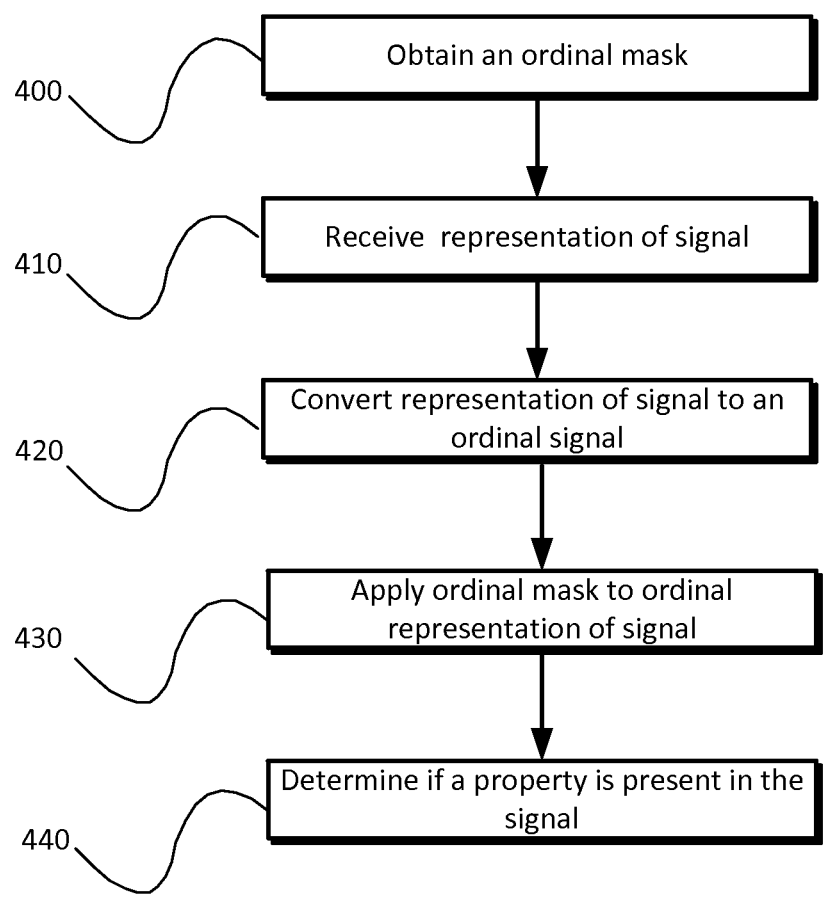

SIGNAL PROCESSING BY ORDINAL CONVOLUTION

BACKGROUND

A convolution can be used to describe the amount of overlap when one function is shifted over another function, which may be useful in signal processing applications including, but not limited to, audio analysis, object recognition, and computer vision. Many types of transforms utilize a convolution such as a Fourier transform, a fast Fourier transform, and a wavelet transform. A convolution is usually based on the dot products of a mask with a representation of a signal at various offsets in, for example, space or time. A mask may be data, or a small compact signal, that is compared to a larger signal. Masks are generally small in comparison to the signal to which they are being compared. For example, for a given signal, a mask may be positioned over parts of the signal at various times or in particular locations. At each time point, the dot product of the mask with the part of the signal is computed to determine the response of the signal with the mask. The collection of dot products forms a trajectory of responses in time or space, depending on the signal, and this trajectory provides a final transform result.

Conventional methods of convolution, specifically the dot product of the representation of the signal and mask, may be limited because they typically are based on the numerical values rendered by the representation of the signal and the mask. This may cause the dot product to be sensitive to signal to noise ratios, dependent upon the signal shape, sensitive to the scale of the signal, or other shortcomings. These properties may be undesirable in signal processing because they may impair analysis or signal detection.

BRIEF SUMMARY

According to an embodiment of the disclosed subject matter, a regular representation of a signal may be received by processor. The regular representation of the signal may contain discrete values. A regular mask may also be received by a processor. The regular mask may contain a set of response values that characterize a property of the signal. The processor may generate an ordinal mask of the signal. The ordinal mask may contain a plurality of binary values indicating a relative magnitude of each of a plurality of response values of the regular mask to each other of the plurality of response values of the regular mask. The processor may generate an ordinal representation of the signal. The ordinal representation of the signal may contain a plurality of binary values indicating a relative magnitude of each of a plurality of response values of the regular representation to each of the other plurality of response values of the regular representation. The ordinal mask may be applied to a portion of the ordinal representation of the signal. It may be determined that the property of the signal characterized by the mask is contained within the signal.

In another embodiment of the disclosed subject matter, an ordinal mask may be obtained. The ordinal mask may describe a property of a signal. A representation of a signal may be received. A processor may convert the representation of the signal to an ordinal representation of the signal. The ordinal mask may be applied to the ordinal representation of the signal. Based upon the application of the ordinal mask to the ordinal representation of the signal, it may be determined that the property is present in the signal.

The representation of the signal may be a transformation or convolution. The transformation may include, but not be limited to, the following: a Fourier transform, a wavelet transform, a fast Fourier transform, a spectral frequency transform, a variable band-pass filter, a Gabor transform, a time frequency transform, or a space frequency transform. Any signal type may be used according to the disclosed methods. For example, a signal may include, but not be limited to, the following: an audio signal, a video signal, an image signal, an electrical signal, a telecommunications signal, or a biological signal.

The ordinal mask may be applied to the ordinal representation of the signal in a manner that may result in an ordinal dot product that is invariant relative to the scale of the signal. In addition, the ordinal mask may be applied to the ordinal representation of the signal in a manner that may result in an ordinal dot product that is invariant relative to the amount of noise present in the received signal when the noise is less than about the order of magnitude of the signal. The ordinal mask may be applied to the ordinal representation of the signal in a manner that may result in an ordinal dot product that is invariant to the mathematical characterization of the signal. In this case, the representation of the signal may have, for example a sinusoid or saw-tooth shape.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4 shows an example process for calculating an ordinal dot product according to an embodiment of the disclosed subject matter.

DETAILED DESCRIPTION

As disclosed herein, an ordinal dot product may be used to provide an ordinal convolution, in contrast to a conventional dot product of the mask with the signal. The term "ordinal" may indicate a dot product that is based on order (e.g., relative magnitudes) of numerical representations of signal elements rather than strictly upon their numerical values. The ordinal convolution in accordance with embodiments of the disclosed subject matter may be applied to any signal processing method or transformations; for example, if the ordinal convolution is applied on a Fourier transform, it becomes an ordinal Fourier transform.

Figure 1:
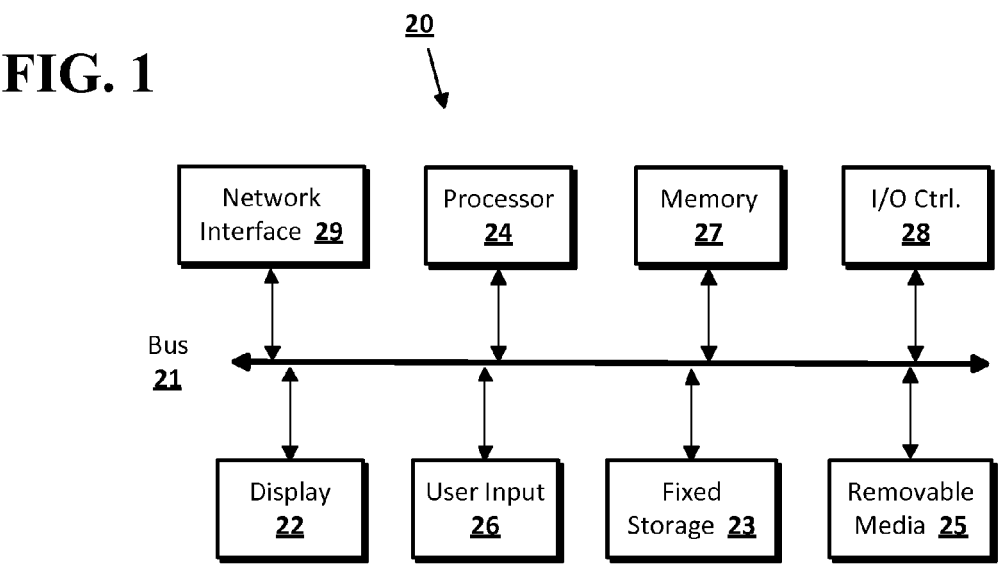
FIG. 1 shows a computer according to an embodiment of the disclosed subject matter.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
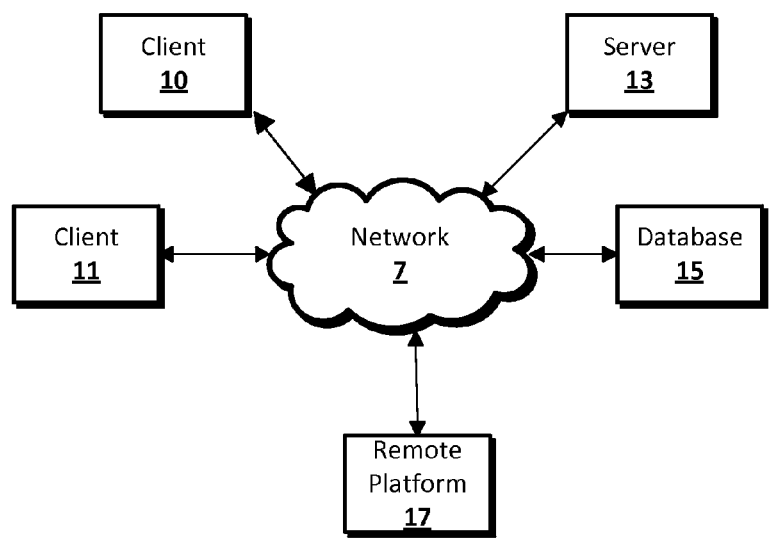
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

Figure 3:
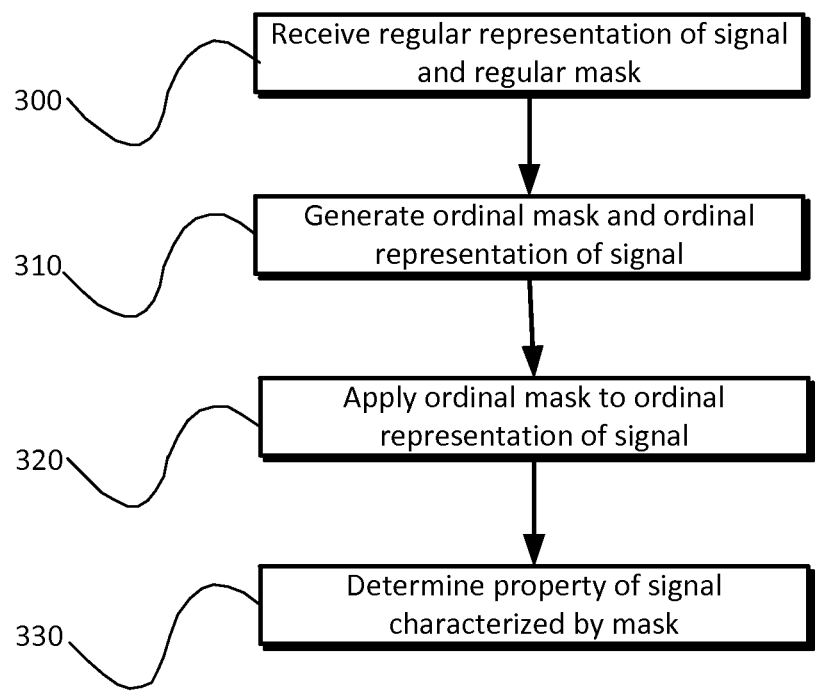
FIG. 3 shows an example process for using an ordinal operation according to an embodiment of the disclosed subject matter.

FIG. 3 shows an example process for using an ordinal operation according to an embodiment of the disclosed subject matter. A regular representation of a signal may be received by a processor at 300. The regular representation of the signal may contain discrete values. A regular mask may also be received by a processor. The regular mask may contain a set of response values that characterize a property of the signal. The processor may generate an ordinal mask at 310. Example processes for generating an ordinal mask or other ordinal representation are provided in further detail herein. The ordinal mask may contain a plurality of binary values indicating a relative magnitude of each of a plurality of response values of the regular mask to each other. As described in further detail herein, the processor may generate an ordinal representation of the signal at 310. The ordinal representation of the signal may contain a plurality of binary values indicating a relative magnitude of each of a plurality of response values of the regular representation to each of the other plurality of response values of the regular representation. At 320 the ordinal mask may be applied to a portion of the ordinal representation of the signal. It may be determined that the property of the signal characterized by the mask is contained within the signal 330.

Various techniques may be used to generate an ordinal mask, signal representation, or other ordinal representation. For example, an ordinal dot product may be determined by receiving a representation of a signal and a mask. A mask may be a set of response values that may characterize a property of the signal. The mask may be transformed into ordinal space by making a pairwise comparison of all points in the mask, for example to determine whether an $i^{th}$ element of the mask is greater than a $j^{th}$ element. Each instance where the $i^{th}$ element is greater than the $i^{th}$ element is scored as a one. If the $i^{th}$ element is not greater than the j' element, it is scored as a zero. This may produce a bit sequence for each response value in the mask that fully characterizes the relative magnitude of that value in relation to every other response value in the mask. The ordinal mask is then the collection of these scores. The ordinal mask may be represented as, for example, the series of scores, a vector or matrix containing the scores, or any other suitable representation. A similar transformation may be performed on a non-ordinal representation of a signal to obtain an ordinal representation of the signal. That is, a bit sequence can be generated for each of several (or all) of the numerical representations of the signal, where the bit sequence characterizes the relative magnitude of that element in relation to some or all of the rest of the elements.

More specifically, a regular mask or representation of a signal may be made ordinal in the following way. Let $M=[m_1, m_2, \ldots, m_k]$ describe the mask and $X=[x_1, x_2, \ldots, x_n]$ be the signal, where k<<n. Let Mt denote a length n sequence at offset t in M. Ignoring boundary effects, the convolution of the mask and the signal may be expressed as $C[t]=M_t*X$, where C[t] is the $t^{th}$ entry in the result of the convolution and the "*" represents the dot product. To transform X into the ordinal space, the following expression is resolved: Ordinal $(X)=[(x_1>x_2), (x_1>x_3), \ldots, (x_1>x_n), (x_2>x_3), \ldots, (x_{(n-1)}>x_n)]$. This expression encodes a pairwise order of relations within the mask X or the ordinal encoding of X. The ordinal dot product may then be calculated by applying the ordinal mask to the ordinal representation of the signal. That is, the ordinal dot product may be defined as a dot product in the ordinal embedding space such that $C[t]=Ordinal(M_t)*Ordinal(X)$. Ultimately, a trajectory of responses may be obtained, for example, in time or space depending on the signal.

FIG. 4 shows an example process for calculating an ordinal dot product according to an embodiment of the disclosed subject matter. An ordinal mask may be obtained at 400, which describes a property of a signal. The mask may be pre-generated and stored in a computer readable medium, or may be generated or received at the time of processing. A representation of a signal may be received at 410. The representation may be a "regular" representation, i.e., any conventional non-ordinal representation, such as a series of values within a frequency range or other domain. A processor may convert the representation of the signal to an ordinal representation of the signal at 420, such as by using the techniques disclosed herein. The ordinal mask may be applied to the ordinal representation of the signal at 430. Based upon the application of the ordinal mask to the ordinal representation of the signal at 430, it may be determined that the property is present in the signal at 440. For example, an ordinal dot product of the ordinal mask with the ordinal representation of the signal may be calculated. If the product is within a certain range or the mask otherwise matches the signal, the signal may be said to contain the property associated with the mask.

The regular representation of the signal may itself be a transformation (commonly referred to as a transform) or convolution. The transformation may include, but not be limited to, the following: a Fourier transform, a wavelet transform, a fast Fourier transform, a spectral frequency transform, a variable band-pass filter, a Gabor transform, a time frequency transform, a space frequency transform, or any other suitable transform. Any signal type may be used according to the disclosed methods. For example, a signal may include, but not be limited to, the following: an audio signal, a video signal, an image signal, an electrical signal, a telecommunications signal, a biological signal, or any other signal that is a numerical representation of a natural or artificial phenomenon.

Ordinal convolution may provide many advantages over conventional convolution. Random noise in a signal will not affect the transformation until the magnitude of the noise causes signal elements to reverse their order. For example, an embodiment of the disclosed subject matter includes a method whereby an ordinal mask may be applied to the ordinal representation of the signal in a manner that may result in an ordinal dot product that is invariant relative to the amount of noise present in the received signal when the noise is less than about the order of magnitude of the signal. This property is not known to exist in traditional convolution or transforms.

For example, an ordinal convolution may be performed on a cosine wave to generate an ordinal cosine transform. A set of masks may be employed to perform the cosine transform. The cosine wave may have a single frequency for one of the masks and, for the purposes of this example, it may be assumed that the wave and mask are in the discrete domain. The mask may be represented as a collection of points for which there may be values of the response signal to the applied mask. This may be represented graphically by having, for example time on the x-axis and response on the y-axis. If the mask overlaps with the cosine signal for one hundred points, a matrix may be constructed consisting of the points and the responses, wherein each cell in the matrix may encode a binary test that asks whether the $i^{th}$ element of the mask is greater than the $j^{th}$ element of the mask. The resulting matrix may be symmetric, meaning only the upper portion of the matrix may be necessary for further application. At this point, the mask may be considered preprocessed or in ordinal form. The ordinal mask only contains one hundred points which may now be aligned with an ordinal representation of a signal. The signal may be of any length. For the purposes of this example, the ordinal signal may contain ten thousand points in time. The ordinal mask may be aligned with the first one hundred points of the signal. The dot product of the ordinal mask and the signal may be determined and then the ordinal mask may be shifted one unit. The dot product may again be determined again, and the process repeated until the ordinal mask reaches the end of the signal length. For this example, a time trajectory will be obtained.

An ordinal signal may be generated using a similar process. One hundred points from the signal may correspond to one hundred points of the mask. As disclosed above, each cell in the one hundred by one hundred matrix created by the overlap between the mask and the signal may encode a binary test that asks whether the $i^{th}$ element of the signal is greater than the $j^{th}$ element of the signal. This creates an ordinal representation of the signal. The ordinal dot product between the ordinal signal and the mask may now be determined. The ordinal dot product may be determined between the ordinal mask that was determined above and the ordinal signal determined here.

Although the above example refers to a one dimensional process, ordinal convolution may be applied to two-, three-, or any n-dimensional processes. For example, a two dimensional signal such as an image with one hundred pixels may be analyzed by a 10×10 mask. In this instance, a binary test that asks whether the i$^{th}$ pixel is greater than the j$^{th}$ pixel. The binary encoding will also be performed when the mask is placed on the image.

As another example, the disclosed subject matter may also be applied to audio analysis. Conventionally, performing a Fourier transform on a raw audio sample usually means that, for small windows in time, the Fourier transform is determined. The results of the Fourier transform yield what may be referred to as a spectrogram. However, the Fourier transform could be made ordinal as disclosed herein, yielding an ordinal Fourier transform. Features from the resultant spectrogram may be extracted and utilized for machine learning to, for example, determine if there were any segments of the audio sample that fall within a genre of music. Similarly, ordinal convolution may be applied to speech recognition. One of the problems today with speech recognition is the presence of ambient noise that may corrupt the actual signal of interest. If an ordinal transform and machine learning approach were used, it may be less processor intensive than conventional methods to distinguish the signal from noise because the ordinal conversion of the signal and the mask eliminates the ambient noise from the transform.

An ordinal mask may be applied to an ordinal representation of a signal in a manner that may result in an ordinal dot product that is invariant to the mathematical characterization of the signal. For example, an ordinal convolution with a sinusoidal mask or a saw-tooth signal of the same frequency may yield the same result since they have the same ordinal signature. One skilled in the art would recognize that this embodiment would allow signal shapes of interest to be searched for instead of attempting mathematical reconstruction of the signal.

Ordinal convolution also may be invariant to scale and offset changes, and to any monotone transform on the signal that preserves ranks. For example, if the signal increases by ten-fold, all the points in the ordinal convolution may be multiplied by ten. Thus, an ordinal mask may be applied to an ordinal representation of a signal in a manner that may result in an ordinal dot product that is invariant relative to the scale of the signal.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer implemented method of performing a convolution of a mask with a signal comprising:
   receiving, by a processor a regular representation of an image signal from a client computer, the regular representation comprising a first plurality of discrete values;
   for each value in the first plurality of values, by the processor:
      comparing the value to each other value in the first of the plurality of values; and
      generating a binary value that encodes the comparison;
   combining the binary values generated from the first plurality of values to form an ordinal representation of the signal;
   storing the ordinal representation of the signal in a computer-readable medium;
   receiving, by the processor, a regular mask, the regular mask containing a second plurality of values;
   for each value in the second plurality of values, by the processor:
      comparing the value to each other value in the second of the plurality of values; and
      generating a binary value that encodes the comparison;
   combining the binary values generated from the second plurality of values to form an ordinal mask;
   storing the ordinal mask in a computer-readable storage medium;
   applying the ordinal mask to a portion of the ordinal representation of the signal to provide a convolution of the mask with the signal; and
   providing information about the image signal based on the convolution of the mask with the signal to the client computer.

2. The method of claim 1, wherein the convolution is invariant to noise.

3. A computer implemented method of convolution comprising:
   obtaining an ordinal mask;
   receiving a representation of an image signal from a client computer, the signal comprising a plurality of values;
   converting, by a processor, the representation to an ordinal representation of the signal for each value in the signal:
      comparing the value to each other value in the signal; and
      generating a binary value that encodes the comparison;
   combining the binary values generated to form an ordinal representation of the signal;
   storing the ordinal representation of the signal in a computer-readable medium;
   applying the ordinal mask to the ordinal representation of the signal to provide a convolution of the mask with the signal; and
   providing information about the image signal based upon the convolution of the mask with the signal to the client computer.

4. The method of claim 3, wherein the representation of the signal is a transformation or a convolution.

5. The method of claim 4, wherein the transformation is selected from the group consisting of a Fourier transform, a wavelet transform, a fast Fourier transform, a spectral frequency transform, a variable band-pass filter, a Gabor transform, a time frequency transform, or a space frequency transform.

6. The method of claim 3, wherein applying the ordinal mask to the ordinal representation of the signal results in an ordinal dot product that is invariant relative to the scale of the signal.

7. The method of claim 3, wherein applying the ordinal mask to the ordinal representation of the signal results in an ordinal dot product that is invariant relative to the amount of noise present in the received signal when the noise is less than the order of magnitude of the signal.

8. The method of claim 3, wherein applying the ordinal mask to the ordinal representation of the signal results in an ordinal dot product that is invariant to the mathematical characterization of the signal.

9. The method of claim 8, wherein the representation of the signal has a sinusoidal shape.

10. The method of claim 8, wherein the representation of the signal has a saw-tooth shape.

11. The method of claim 3, wherein a second ordinal mask is applied to the ordinal representation of the signal.

12. The method of claim 3, wherein the provided information is a property of the image signal encoded by the mask.

13. The method of claim 12, wherein the property comprises frequency.

14. The method of claim 3, further comprising:
receiving a regular mask, the regular mask containing a second plurality of values;
for each value in the second plurality of values, by a processor:
comparing the value to each other value in the second of the plurality of values; and
generating a binary value that encodes the comparison;
combining the binary values generated from the second plurality of values to form an ordinal mask; and
storing the ordinal mask in a computer-readable medium.

15. The method of claim 14, wherein the second plurality of values, corresponding to the mask, is derived from a transformation or a convolution.

16. The method of claim 15, wherein the transformation is selected from the group consisting of a Fourier transform, a wavelet transform, a fast Fourier transform, a spectral frequency transform, a variable band-pass filter, a Gabor transform, a time frequency transform, or a space frequency transform.

17. The method of claim 3, wherein the binary values are stored in a database.

18. The method of claim 3, further comprising: applying the ordinal mask to the ordinal representation of the signal at a plurality of locations to generate a trajectory of responses.

19. A computer implemented method of convolution comprising:
obtaining an ordinal mask, wherein the ordinal mask characterizes a property;
receiving a representation of an image signal from a client computer, the signal comprising a plurality of values;
converting, by a processor, the representation to an ordinal representation of the signal for each value in the signal:
comparing the value to each other value in the signal; and
generating a binary value that encodes the comparison;
combining the binary values generated to form an ordinal representation of the signal;
storing the ordinal representation of the signal in a computer-readable medium;
applying the ordinal mask to the ordinal representation of the signal to provide a convolution of the mask with the signal, wherein the convolution determines the presence of the property characterized by the ordinal mask in the signal; and
providing, based on the result of applying the ordinal mask to the ordinal representation, an indication of the presence of the property in the signal to the client computer.

20. A computer implemented method of performing a convolution of a mask with a signal comprising:
receiving, by a processor a regular representation of an audio signal from a client computer, the regular representation comprising a first plurality of discrete values;
for each value in the first plurality of values, by the processor:
comparing the value to each other value in the first of the plurality of values; and
generating a binary value that encodes the comparison;
combining the binary values generated from the first plurality of values to form an ordinal representation of the signal;
storing the ordinal representation of the signal in a computer-readable medium;
receiving, by the processor, a regular mask, the regular mask containing a second plurality of values;
for each value in the second plurality of values, by the processor:
comparing the value to each other value in the second of the plurality of values; and
generating a binary value that encodes the comparison;
combining the binary values generated from the second plurality of values to form an ordinal mask;
storing the ordinal mask in a computer-readable storage medium;
applying the ordinal mask to a portion of the ordinal representation of the signal to provide a convolution of the mask with the signal; and
providing information about the audio signal based on the convolution of the mask with the signal to the client computer.

21. A computer implemented method of convolution comprising:
obtaining an ordinal mask;
receiving a representation of an audio signal from a client computer, the signal comprising a plurality of values;
converting, by a processor, the representation to an ordinal representation of the signal for each value in the signal:
comparing the value to each other value in the signal; and
generating a binary value that encodes the comparison;
combining the binary values generated to form an ordinal representation of the signal;
storing the ordinal representation of the signal in a computer-readable medium;
applying the ordinal mask to the ordinal representation of the signal to provide a convolution of the mask with the signal; and
providing information about the audio signal based upon the convolution of the mask with the signal to the client computer.

22. The method of claim 21, wherein the representation of the signal is a transformation or a convolution.

23. The method of claim 22, wherein the transformation is selected from the group consisting of a Fourier transform, a wavelet transform, a fast Fourier transform, a spectral frequency transform, a variable band-pass filter, a Gabor transform, a time frequency transform, or a space frequency transform.

24. The method of claim 21, wherein applying the ordinal mask to the ordinal representation of the signal results in an ordinal dot product that is invariant relative to the scale of the signal.

25. The method of claim 21, wherein applying the ordinal mask to the ordinal representation of the signal results in an ordinal dot product that is invariant relative to the amount of noise present in the received signal when the noise is less than the order of magnitude of the signal.

26. The method of claim 21, wherein applying the ordinal mask to the ordinal representation of the signal results in an ordinal dot product that is invariant to the mathematical characterization of the signal.

27. The method of claim 26, wherein the representation of the signal has a sinusoid shape.

28. The method of claim 26, wherein the representation of the signal has a saw-tooth shape.

29. The method of claim 20, wherein the convolution is invariant to noise.

30. The method of claim 21, wherein a second ordinal mask is applied to the ordinal representation of the signal.

31. The method of claim 21, wherein the provided information is a property of the audio signal encoded by the mask.

32. The method of claim 31, wherein the property comprises frequency.

33. The method of claim 21, further comprising:
receiving a regular mask, the regular mask containing a second plurality of values;
for each value in the second plurality of values, by a processor:
comparing the value to each other value in the second of the plurality of values; and
generating a binary value that encodes the comparison;
combining the binary values generated from the second plurality of values to form an ordinal mask; and
storing the ordinal mask in a computer-readable medium.

34. The method of claim 33, wherein the second plurality of values, corresponding to the mask, is derived from a transformation or a convolution.

35. The method of claim 34, wherein the transformation is selected from the group consisting of a Fourier transform, a wavelet transform, a fast Fourier transform, a spectral frequency transform, a variable band-pass filter, a Gabor transform, a time frequency transform, or a space frequency transform.

36. The method of claim 21, wherein the binary values are stored in a database.

37. The method of claim 21, further comprising: applying the ordinal mask to the ordinal representation of the signal at a plurality of locations to generate a trajectory of responses.

38. A computer implemented method of convolution comprising:
obtaining an ordinal mask, wherein the ordinal mask characterizes a property;
receiving a representation of an audio signal from a client computer, the signal comprising a plurality of values;
converting, by a processor, the representation to an ordinal representation of the signal for each value in the signal:
comparing the value to each other value in the signal; and
generating a binary value that encodes the comparison;
combining the binary values generated to form an ordinal representation of the signal;
storing the ordinal representation of the signal in a computer-readable medium;
applying the ordinal mask to the ordinal representation of the signal to provide a convolution of the mask with the signal, wherein the convolution determines the presence of the property characterized by the ordinal mask in the signal; and
providing, based on the result of applying the ordinal mask to the ordinal representation, an indication of the presence of the property in the signal to the client computer.

39. A computer implemented method of performing a convolution of a mask with a signal comprising:
receiving, by a processor a regular representation of a video signal from a client computer, the regular representation comprising a first plurality of discrete values;
for each value in the first plurality of values, by the processor:
comparing the value to each other value in the first of the plurality of values; and
generating a binary value that encodes the comparison;
combining the binary values generated from the first plurality of values to form an ordinal representation of the signal;
storing the ordinal representation of the signal in a computer-readable medium;
receiving, by the processor, a regular mask, the regular mask containing a second plurality of values;
for each value in the second plurality of values, by the processor:
comparing the value to each other value in the second of the plurality of values; and
generating a binary value that encodes the comparison;
combining the binary values generated from the second plurality of values to form an ordinal mask;
storing the ordinal mask in a computer-readable storage medium;
applying the ordinal mask to a portion of the ordinal representation of the signal to provide a convolution of the mask with the signal; and
providing information about the video signal based on the convolution of the mask with the signal to the client computer.

40. A computer implemented method of convolution comprising:
obtaining an ordinal mask;
receiving a representation of a video signal from a client computer, the signal comprising a plurality of values;
converting, by a processor, the representation to an ordinal representation of the signal for each value in the signal:
comparing the value to each other value in the signal; and
generating a binary value that encodes the comparison;
combining the binary values generated to form an ordinal representation of the signal;
storing the ordinal representation of the signal in a computer-readable medium;
applying the ordinal mask to the ordinal representation of the signal to provide a convolution of the mask with the signal; and
providing information about the video signal based upon the convolution of the mask with the signal to the client computer.

41. The method of claim 21, wherein the representation of the signal is a transformation or a convolution.

42. The method of claim 22, wherein the transformation is selected from the group consisting of a Fourier transform, a wavelet transform, a fast Fourier transform, a spectral frequency transform, a variable band-pass filter, a Gabor transform, a time frequency transform, or a space frequency transform.

43. The method of claim 21, wherein applying the ordinal mask to the ordinal representation of the signal results in an ordinal dot product that is invariant relative to the scale of the signal.

44. The method of claim 21, wherein applying the ordinal mask to the ordinal representation of the signal results in an ordinal dot product that is invariant relative to the amount of noise present in the received signal when the noise is less than the order of magnitude of the signal.

45. The method of claim 21, wherein applying the ordinal mask to the ordinal representation of the signal results in an ordinal dot product that is invariant to the mathematical characterization of the signal.

46. The method of claim 26, wherein the representation of the signal has a sinusoid shape.

47. The method of claim 26, wherein the representation of the signal has a saw-tooth shape.

48. The method of claim 20, wherein the convolution is invariant to noise.

49. The method of claim 21, wherein a second ordinal mask is applied to the ordinal representation of the signal.

50. The method of claim 21, wherein the provided information is a property of the video signal encoded by the mask.

51. The method of claim 31, wherein the property comprises frequency.

52. The method of claim 21, further comprising:
receiving a regular mask, the regular mask containing a second plurality of values;
for each value in the second plurality of values, by a processor:
comparing the value to each other value in the second of the plurality of values; and
generating a binary value that encodes the comparison;
combining the binary values generated from the second plurality of values to form an ordinal mask; and
storing the ordinal mask in a computer-readable medium.

53. The method of claim 33, wherein the second plurality of values, corresponding to the mask, is derived from a transformation or a convolution.

54. The method of claim 34, wherein the transformation is selected from the group consisting of a Fourier transform, a wavelet transform, a fast Fourier transform, a spectral frequency transform, a variable band-pass filter, a Gabor transform, a time frequency transform, or a space frequency transform.

55. The method of claim 21, wherein the binary values are stored in a database.

56. The method of claim 21, further comprising: applying the ordinal mask to the ordinal representation of the signal at a plurality of locations to generate a trajectory of responses.

57. A computer implemented method of convolution comprising:
obtaining an ordinal mask, wherein the ordinal mask characterizes a property;
receiving a representation of a video signal from a client computer, the signal comprising a plurality of values;
converting, by a processor, the representation to an ordinal representation of the signal for each value in the signal:
comparing the value to each other value in the signal; and
generating a binary value that encodes the comparison;
combining the binary values generated to form an ordinal representation of the signal;
storing the ordinal representation of the signal in a computer-readable medium;
applying the ordinal mask to the ordinal representation of the signal to provide a convolution of the mask with the signal, wherein the convolution determines the presence of the property characterized by the ordinal mask in the signal; and
providing, based on the result of applying the ordinal mask to the ordinal representation, an indication of the presence of the property in the signal to the client computer.

* * * * *